United States Patent [19]

Savor et al.

[11] 4,178,966
[45] Dec. 18, 1979

[54] TUBE PLUG

[75] Inventors: Dennis E. Savor, Hixson, Tenn.; Roderick G. Rohrberg, Torrance, Calif.

[73] Assignee: Combustion Engineering, Inc., Windsor, Conn.

[21] Appl. No.: 876,958

[22] Filed: Feb. 13, 1978

[51] Int. Cl.² .................................. F16L 55/10
[52] U.S. Cl. .............................. 138/89; 138/109; 228/60
[58] Field of Search ............... 138/89, 91, 96 R, 109; 228/60, 107; 29/401 C, 401 D

[56] References Cited
U.S. PATENT DOCUMENTS

| 3,574,312 | 4/1971 | Miller | 138/89 |
| 3,893,487 | 7/1975 | Engelking | 138/89 |
| 3,900,939 | 8/1975 | Greacen | 29/401 D |
| 3,987,930 | 10/1976 | Fuson | 138/89 |

Primary Examiner—Lenard A. Footland
Attorney, Agent, or Firm—Arthur L. Wade

[57] ABSTRACT

A metallic body is formed to have a clearance fit up into a reamed and spot faced tube extended through, and welded to a tubesheet. The form of the body provides a lip which functions to limit the distance the body can be inserted into the tube and supply filler material at the weld zone between the body and the tube.

2 Claims, 2 Drawing Figures

TUBE PLUG

BACKGROUND OF THE INVENTION the present invention is presently concerned, primarily, with nuclear steam generators. These units are designed and constructed with an excess of heat exchange tubing. When the inevitable leaks develop in the tubing it is practical to seal large numbers of the leaking tubes without reducing the capacity of the unit.

The present practice is to close down the complete system. The primary 111side of the steam generator is drained of water and the system cleaned of radioactive residue. The manways are opened for personnel to enter the primary side of the generator for repair.

The repair procedure is to plug off the defective tubes of both the inlet and outlet side of the tube-to-tubesheet joint. At present, a force-fit tube plug is driven into the end of the tube extended through its tubesheet. The plug is then manually seal-welded into place at the surface of the tubesheet. Obviously, the present practice requires personnel to drive the plug into place within the tube and manipulate the welding torch at the work area.

What is needed is a design for a tube plug which enables the plug to be virtually self-locating to obviate driving the plug into place within its tube. Further, manual manipulation of the plug should be eliminated and a positive stop provided to insure the proper depth for the plug to be positioned in the tube hole for proper welding.

SUMMARY OF THE INVENTION

The present invention is included in the form of a metallic plug body. The general form is cylindrical, bullet-shaped, with a first end tapered to facilitate insertion of the plug into a tube hole. The diameter is fixed to provide a clearance fit with the wall of the tube hole. A bore is formed from the second end of the plug body with the form of a cylinder to provide a bearing area for the mandrel of a welding machine. The principal feature of the plug body form is a flange formed on the second end which flares outwardly with a radius sized to match the radius spot-faced at the weld zone on the entrance to the tube hole in providing a positive stop for the plug body inserted in the tube hole and filler material at the weld zone between the plug body and the tube.

Other objects, advantages and features of the invention will become apparent to one skilled in the art upon consideration of the written specification, appended claims, and accompanying drawings.

BRIEF DESCRIPTION OF THE INVENTION

Figure 1:
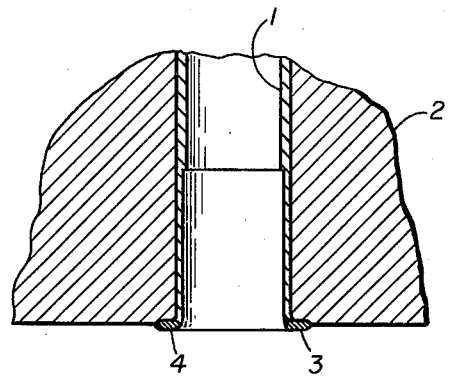
FIG. 1 is a partially sectioned elevation of a tube to be sealed as it extends through its tubesheet and a plug body, which embodies the invention, aligned for insertion into the tube hole.
Figure 1:
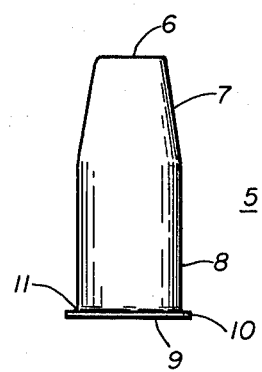

Referring to FIG. 1, a defective tube 1 is disclosed as extending one of its ends through tubesheet 2. The defect in the tube is not shown, nor the other end of the tube. The second end of the tube is also through a tubesheet. Both ends of the tube are sealed to take the tube out of service.

Preparation of the tube is made to receive a plug body which is welded at the tube hole opening. The preparation preferably includes at least a reaming operation to size the tube to receive any one plug of a number of plugs having a common diameter. Secondly, the original weld area 3 between the tube 1 and tubesheet 2 is spot-faced to a radius 4 which will match that of the fillet on any of the plug bodies embodying the invention.

Plug body 5 so closely resembles the cartridges of a firearm that the descriptive term "bullet-shaped" adheres to the body. From the drawings it it obvious that the plug is generally cylindrical. The first, upper, end 6 is tapered at 7 to facilitate entry into the hole of tube 1. The main body of the plug at 8 is in the form of a straight cylinder with a diameter which will have a clearance fit with the reamed wall of the tube hole.

The second, lower, end 9 has a flange 10 which functions to both limit the insertion of the plug body into the tube hole and provide filler material at the weld area. Fillet radius 11 is formed to match the radius 4 spot-faced on the original weld area.

Figure 2:
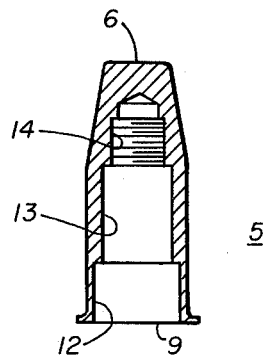
FIG. 2 is a sectioned elevation of the plug body of FIG. 1 to a scale which clearly discloses the internal configuration of the body.

FIG. 2 is limited to disclosing the plug body 5. However, the body is sectioned and enlarged to a scale which discloses the invention with complete clarity. The ends 6 and 9 are as in FIG. 1. The taper 7 and cylindrical side 8 are as in FIG. 1. The flange 11 on the lower, second, end 9 is more complete in this FIG. 2 with the sectioning.

Further, FIG. 2 discloses the plug body 5 is a shell. There are three counterbores, the third of which extends up, as viewed in the drawings, close to end 6. Each counterbore serves a separate purpose. For orderly disclosure, the lower is designated 12, the first of the three counterbores.

The second counterbore 13 is sized to receive the mandrel of a welding machine. It is a well developed art to rotate a welding electrode around the circular seam between the lower edge of a plug and the original weld area of the tube and tubesheet. The walls of counterbore 13 provide the bearing surface which provide the stability for the welding operation.

The third counterbore 14 is threaded. Should the occasion demand, the threaded end of a shaft can be threadedly engaged with this counterbore 14 to provide an anchor with which to exert a removal force upon the plug body. This provision may be rarely used, but it is also readily provided to be available when it is needed.

Returning to the first counterbore 12, this is the location on the plug body where the wall thickness is a critical factor in the stress pattern formed during operation of the vessel in which the tubesheet is mounted. Therefore, the diameter of this counterbore is a matter separate from the diameters of counterbore 13 and 14. The counterbore 12 diameter determines the isolation of stress from the weld area 3. More specifically, the wall of counterbore 12 is thinned until it will flex to the degree necessary to compensate for flexure of tubesheet 2 during operation of its vessel.

It is not difficult to accept that during operation of the vessel in which tubesheet 2 is mounted, fluids flow through the vessel under great temperature variations and large pressures. Obviously the tubes and sheets are subjected to great stress from the forces generated by temperature and pressure. Flexure takes place in the tubesheet, its tubes and in the plug embodying the present invention. As the structures flex under the forces, it is adviseable to have the wall of the counterbore 12 give or move, otherwise stress upon the plug wall will be directed into the weld area 3 and increase the hazard of mechanical failure of the weld with resulting migration, or escape, of radioactive fluids. Ready flexure of the wall of counterbore 12 is provided by the diameter of the plug at this location in its structure.

The lip 10 flares from the sides of body plug 5. Where there is a flair there is a fillet. In the present case the fillet 11. This fillet 11 is carefully formed to provide a radius which just happens to match the radius 4 spot-faced on the original weld between tube 1 and tubesheet 2. Thus, when the body plug 5 is shoved up into the tube 1 hole, flange 10 mates solidly with the edge of the tube 1 hole. The clearance fit positioning of the plug in the hole is positive and uniform between each plug and tube hole selected for sealing.

Finally, there is the matter of the bulk of the material of the flange 10. The flange is provided with enough mass to supply all the filler material needed at the weld area when it is time to apply the welding electrode in the final sealing operation.

From the foregoing, it will be seen that this invention is well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A metallic plug body to be seal-welded in the end of a tube which tube extends through and is welded to a tubesheet, the plug body having, a generally cylindrical and bullet-shaped form which is tapered on the first end to be inserted into the tube to which the body is to be seal-welded and which is sized from the second end to have a clearance fit with the wall of the tube hole, a first bore formed from the second end with a diameter which provides a wall with a predetermined flexure, a second bore formed from the second end as a counterbore to the first bore to provide a cylindrical bearing area for the mandrel of a welding machine which seal-welds the plug to the tube, and a flange on the second end and formed to flare from the outside wall of the plug body in a radius which matches the radius which is spot faced at the weld zone on the entrance to the tube hole to be plugged in forming a positive stop limitation to the plug body as it is inserted into the tube while the flange also provides filler material at the weld zone between the plug body and the tube.

2. The plug of claim 1 having, a third bore formed from the second end as a counterbore to the second bore and which is threaded to provide an anchor for a shaft threaded on the end and inserted up into the plug from the second end with which to exert a removal force upon the plug.

* * * * *